(12) United States Patent
Yeung

(10) Patent No.: US 6,494,047 B2
(45) Date of Patent: Dec. 17, 2002

(54) AIRFLOW SHARING

(75) Inventor: Robert W. M. Yeung, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 11 days.

(21) Appl. No.: 09/849,764

(22) Filed: May 4, 2001

(65) Prior Publication Data

US 2002/0069646 A1 Jun. 13, 2002

Related U.S. Application Data

(60) Provisional application No. 60/251,910, filed on Dec. 7, 2000.

(51) Int. Cl.[7] ................................................ F02L 6/08
(52) U.S. Cl. ........................................... 60/782; 60/785
(58) Field of Search ....................... 60/782, 785, 39.15, 60/795; 454/74

(56) References Cited

U.S. PATENT DOCUMENTS

| | | | |
|---|---|---|---|
| 4,300,587 A | 11/1981 | Daeschner | 137/117 |
| 4,384,818 A | 5/1983 | Blotenberg | 415/1 |
| 4,506,594 A | 3/1985 | Rowland et al. | 98/1.5 |
| 4,671,318 A | 6/1987 | Benson | 137/486 |
| 4,765,131 A | 8/1988 | Benson | 60/39.02 |
| 4,779,644 A | 10/1988 | Benson | 137/906 |
| 5,155,991 A | 10/1992 | Bruun | 60/39.07 |

*Primary Examiner*—Ehud Gartenberg
(74) *Attorney, Agent, or Firm*—Larry J. Palguta

(57) ABSTRACT

The airflow distribution of bleed air extracted from a plurality of turbine engines (11, 13, 15, 17) is equalized by an airflow sharing system having electronic airflow sensors (49, 51, 53, 55) and closed-loop control algorithm to equalize the pressure-drop characteristics of multiple bleed air branches to flow-share equally. The pressure-drop characteristic of each airflow branch is controlled to the same setpoint characteristic by negative feedback. The closed-loop control can be implemented with an electronic circuit or as a computational process in a digital controller.

19 Claims, 5 Drawing Sheets

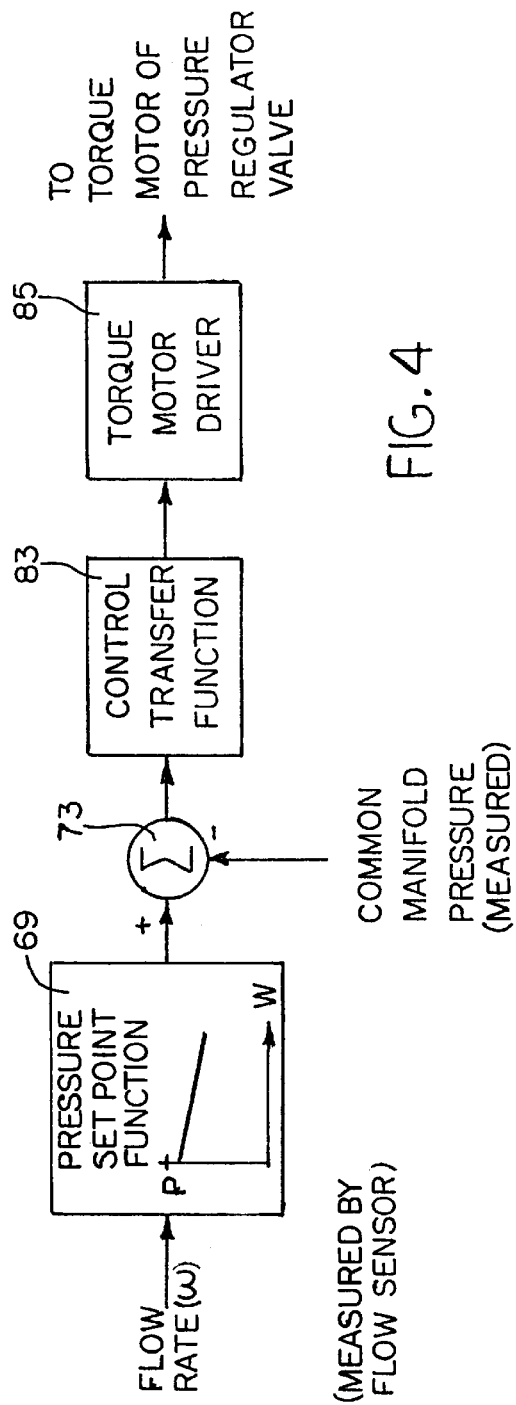
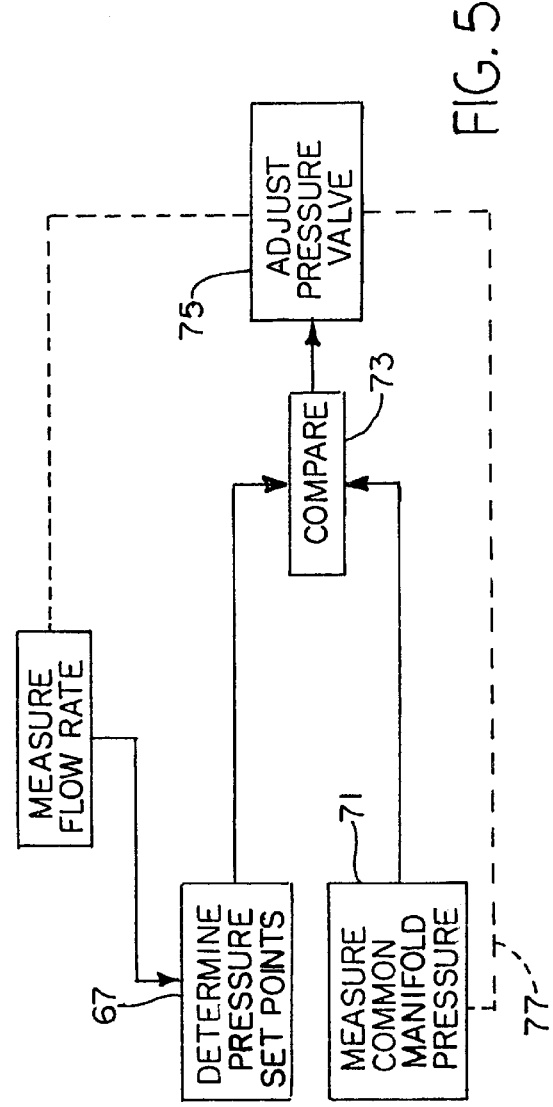
FIG. 4
FIG. 5

AIRFLOW SHARING

CROSS-REFERENCE TO RELATED APPLICATIONS

This application claims the benefit of U.S. Provisional Patent Application No. 60/251,910 filed Dec. 7, 2000 and entitled AIRFLOW SHARING.

BACKGROUND OF THE INVENTION

The present invention relates to airflow distribution of bleed air extracted from turbine engines, and more particularly to a system for equalizing the airflow distribution among a plurality of engines.

It is a common practice to bleed air from one or more gas turbine aircraft engines to provide pneumatic and thermal power to different aircraft systems, for example, for cabin pressurization and temperature control, equipment environmental control, thrust reversing systems, anti-icing equipment, and pneumatically powered equipment. It is desirable to distribute the burden of supplying air for these auxiliary functions among the several engines of the aircraft. U.S. Pat. No. 4,765,131 entitled AIRCRAFT ENGINE BLEED AIR FLOW BALANCING TECHNIQUE recognizes these problems, measures the pressure drop across a heat exchanger and employs limited authority negative feedback to control a pressure regulating valve for each of two duct systems. Without accurate allocation of the airflow burden among the several engines, the engine having the greatest burden experiences disproportionate diminished fuel economy, elevated operating temperature, and increased wear and maintenance requirements. These problems are discussed in greater detail in the U.S. Pat. No. 4,765,131.

In an application entitled BLEED AIR FLOW REGULATORS WITH FLOW BALANCE, U.S. Pat. No. 5,155,991 recognizes the shortcomings of the U.S. Pat. No. 4,765,131 patented system due to errors in sensing the pressure drop across the heat exchanger and measures not only the pressure differential across a heat exchanger (precooler), but also another downstream pressure differential and precooler outlet temperature and pressure values in an attempt to refine the equalization of the flow of bleed air from each of several gas turbine engines. The U.S. Pat. No. 5,155,991 control scheme for each flow branch requires the flow information from its own branch and the flow information from the other branch. The cross-feeding of flow information is the key to equalize the flows in the two branches. The system is suitable only for a two-branch flow system. A control scheme for a four-engine system is an extremely challenging control problem, with cross-feeding of all four flow information to all four control channels, creating enormous interaction problem. There remains a need for comparatively simple and economical, yet highly accurate and reliable technique for allocating bleed airflow among several aircraft engines, and this need is particularly acute for applications involving more than two engines.

It is desirable to equally share the air supply responsibilities among the several engines of an aircraft, and to do so in an economical and accurate manner.

SUMMARY OF THE INVENTION

The present invention provides solutions to the above problems by measuring individual flow rates and a common downstream manifold pressure, and uses electronic/computer means to implement negative-feedback control for creating identical, e.g., linear, pressure-versus-flow characteristics for all flow branches. Flow branches with identical pressure-drop characteristics will allow the supply sources to naturally and accurately flow-share.

The invention comprises, in one form thereof, a technique for allocating an aircraft air supply demand among several independently operable aircraft engines, each supplying air to a common manifold by way of a corresponding air duct having an inlet pressure control valve for regulating the duct airflow. The rate of airflow through each individual duct may be measured and that measurement used in determining the desired air pressure set point. Additionally, a common manifold air pressure is measured. A combination of the determined and measured pressures is used to generate a corrective control command to the corresponding pressure control valve for each duct independently of the others. Airflow as used herein means the air flow rate, e.g. measured in pounds of air per minute, while pressure drop is measured, for example in pounds per square inch.

An advantage of the present invention is that all ducts can be independently set by controlling individual pressure regulating valves to create identical pressure-drop characteristics downstream of the valves as a function of mass flow rate regardless of differences in downstream pressure drops due to the individual duct length, cross-section area, shape and internal contamination, which is indeterminate in time. Ducts with identical pressure-drop characteristics will flow-share naturally.

BRIEF DESCRIPTION OF THE DRAWINGS

A more complete understanding of the present invention will become apparent from the following description taken in conjunction with the accompanying drawings in which:

FIG. 4 shows a closed-loop control algorithm for implementing the present invention;

FIG. 5 is a schematic illustration of the fluid flow controlling process according to the present invention.

Corresponding reference characters indicate corresponding parts throughout the several drawing views.

DETAILED DESCRIPTION OF THE PREFERRED EMBODIMENT

Figure 1:
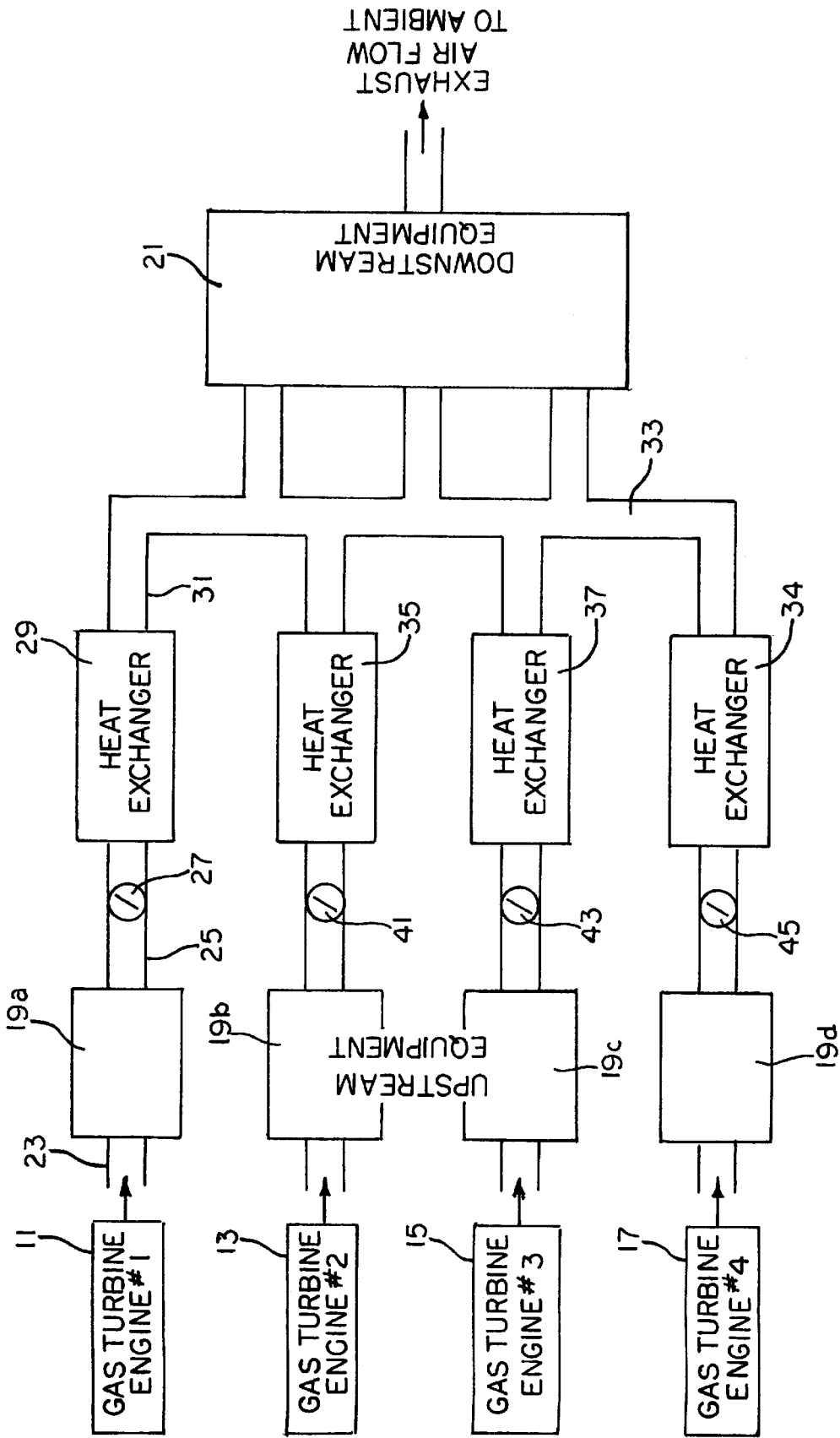
FIG. 1 illustrates multiple-engine bleed air sources, pressure regulated and flowing into a common manifold before being distributed to a number of different destinations.

Referring now to the drawings and particularly to FIG. 1, there is shown an aircraft pneumatic system for supplying pressurized air from a plurality of aircraft engines 11, 13, 15 and 17 to multiple air utilization devices including upstream equipment 19a, 19b, 19c and 19d and downstream equipment 21. There may be no upstream equipment and whatever upstream equipment is present maintains the airflows separate from one another. There is no mixing of the flows upstream of the heat exchangers such as 29. Airflow from engine 11, for example, passes through an air duct or conduit portion 23, into the upstream equipment associated with that engine (if any), then by duct portion 25 to the inlet of a pressure regulating valve 27. From the outlet of valve 27, the airflow continues through additional airflow equipment 29, which may, for example, comprise a heat exchanger for reducing the air temperature to a preferred level. The airflow exits the equipment 29 by way of conduit portion 31 and enters a common manifold 33 where the engine #1 airflow is mixed with the airflow from the other engines. The common airflow is supplied to the downstream utilization equipment 21 and thereafter exits the aircraft.

In FIG. 1, there are a plurality of air temperature reducing heat exchangers 29, 35, 37 and 39, each having an air inlet and an air outlet. A like plurality of air passageways similar to 25 lead from an engine to the inlet of a corresponding heat exchanger and each passageway includes a controllable pressure reduction valve 27, 41, 43, and 45 for controlling the airflow from the associated engine to the associated heat exchanger. The multiple-engine bleed air sources 11, 13, 15 and 17 are pressure regulated by 27, 41, 43 and 45 respectively and flow into a common manifold 33 before being distributed to a different number of destinations as indicated generally at 21. The common manifold 33 merges the airflows exiting the plurality of heat exchangers into a common airflow path and a plurality of air passageways similar to 31 each lead from a heat exchanger to the manifold. The prior art technique, as exemplified by the aforementioned U.S. Pat. No. 4,765,131, utilizes the pressure differential across a heat exchanger for controlling a corresponding valve. The bleed air extracted from turbine engines of an airplane must be equally distributed among the engines, otherwise the engine with the higher airflow will run hotter and will have increased wear and reduced life. Small differences in pressure regulation are inevitable and airflow ducts downstream are different in length and have different pressure-drop characteristics. The result is that airflow distribution will not be equal.

Figure 2:
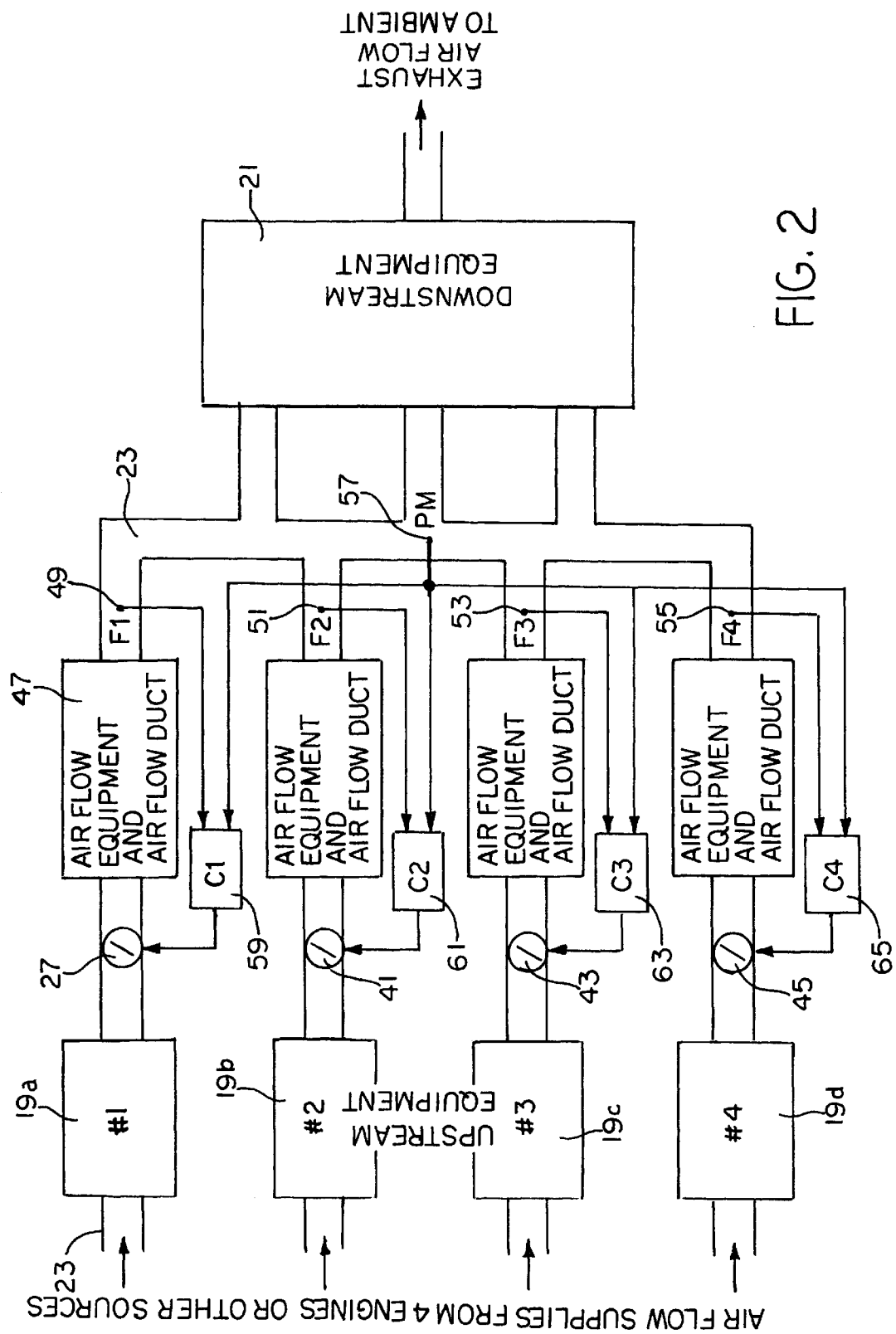
FIG. 2 shows modifications to FIG. 1 to achieve airflow sharing in accordance with the invention.
Figure 3:
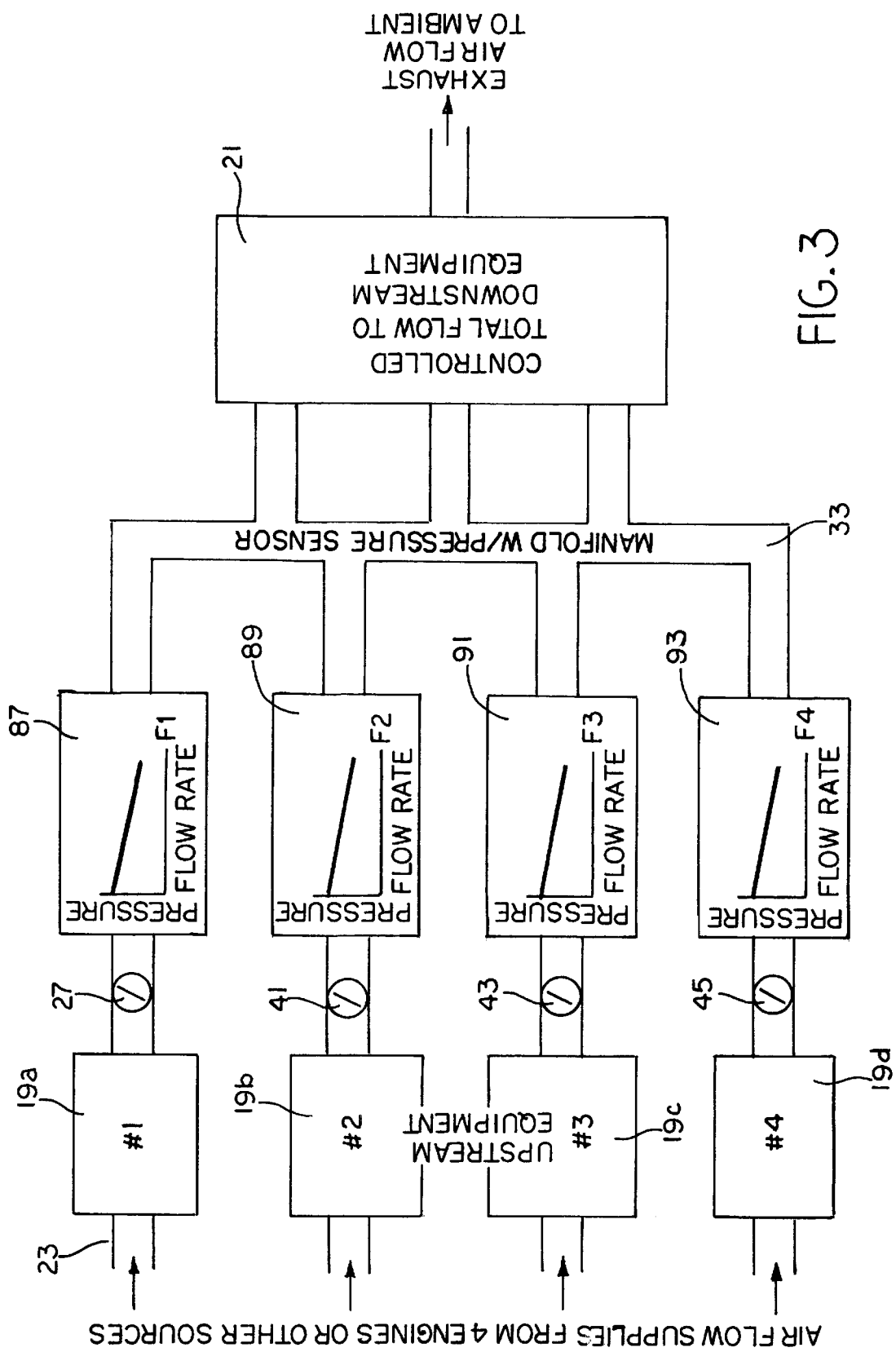
FIG. 3 shows, in accordance with the invention, four airflow branches with the same pressure-drop characteristics.

FIG. 2 is similar to FIG. 1 in showing a plurality of engines or other air flow supplies feeding air to optional upstream equipment 19a, 19b, 19c and 19d by way of conduits such as 23. The individual airflow paths include pressure regulators such as 27 as before, and heat exchangers or other airflow equipment such as 47 the outlets of which merge in a manifold 33. Heat exchangers are typical pressure-drop elements of a typical system, but are not elements that are necessary to make this flow-sharing scheme work. Furthermore, the flow-sharing scheme is applicable to systems other than pneumatic systems on aircraft. Each conduit also includes an airflow sensing device 49, 51, 53 or 55 for measuring the airflow therethrough. A pressure sensor 57 is positioned within the manifold 33 for determining a common fluid passageway outlet pressure. A plurality of control arrangements 59, 61, 63, and 65 are each associated with and control a corresponding valve 27, 41, 43 and 45 respectively. Each control arrangement specifies a set point pressure as a function of the flow rate and controls the flow rate through each heat exchanger independently of the flow rates through the other heat exchangers. This equalizes the pressure-drop characteristics of airflow paths from the outlet of each valve to the manifold causing those paths to equally share the flow. As before, air utilization equipment 21 receives air by way of the common airflow path through the manifold 33. Using the individual flow sensor signal and the common pressure sensor signal, the unequal pressure-drop characteristics of the four airflow branches are transformed by the closed-loop control algorithm of FIGS. 4 and 5 into four airflow branches with the same pressure-drop characteristics as shown in FIG. 3. The algorithm of FIGS. 4 and 5 is independently replicated for each of the illustrative four ducts by the control arrangements 59, 61, 63 and 65 in FIG. 2 and as functionally illustrated at 87, 89, 91 and 93 in FIGS. 3 and 6.

Referring primarily to FIGS. 4 and 5, the method of allocating the aircraft air supply demand among the several independently operable aircraft engines 11, 13, 15 and 17 should now be clear. A plurality of pressure control set points (pressure setpoint function 69) are predetermined at 67 for each flow branch. These provide the desired air pressure drop for each flow branch. Preferably, the pressure drop across the control valve is a linear function of duct flow rate, and in a preferred form, the linear function has a negative slope (a strictly decreasing function) with air pressure decreasing as duct flow rate increases. The actual setpoint value to which the common manifold pressure is compared is calculated at 67 with the individual duct flow rates measured at 81. The common manifold air pressure is measured as indicated at 71 by sensor 57. The selected setpoint is combined with or compared to the common manifold pressure as indicated at 73, and the result is utilized to control the corresponding valve as indicated at 75. The result of adjusting the pressure control valve provides a pneumatic feedback as indicated at 77 thereby closing the feedback loop. Comparison 73 may, if desired, include a threshold function below which no adjustment occurs to avoid continuous minute changes or "hunting." That is, the flow rate specifies the abscissa value along the linear function 69 thereby determining a specific ordinate value of pressure.

The control transfer function 83 of FIG. 4 facilitates closed-loop control. Closed-loop control forces the pressure parameter under control (the pressure downstream of the corresponding control valve) to follow the setpoint closely. Since the setpoint is typically not set to a fixed pressure number, but rather is a linearly drooping pressure as a function of flow rate, the controlled pressure as measured at 57 in the common manifold must follow the linear function also. The pressure vs. flow relationship (setpoint function 69) may be a continuous linear function, two or more linear segments, a finite set of discrete values, or other strictly decreasing relationship. The control transfer function and the linear variable setpoint function are computational modules in software if computer control is used, or electronic circuit functions if analog control is used, and supply control signals to torque motor driver 85 which functions to adjust the corresponding valve. The control transfer function 83 is typically a proportional plus integral function that result in reducing the error from the summing junction 73 to zero in the steady state.

Uncontrolled, i.e., natural pressure drop is proportional to the square of the mass flow rate. The constant of proportionality is determined by the air density and mechanical design of the duct, however, a linear setpoint function is preferred for the control algorithm so that closed-loop control action will result in a controlled pressure that is a linear function of the flow rate, instead of the quadratic relationship that obeys the law of physics. Having two (or more) identical linear droop characteristics in the two (or multiple) airflow ducts results in balanced flow distribution.

It is important that, at the maximum operating flow rate, the pressure drop determined by the variable setpoint functions be slightly greater than the pressure drop that would be naturally encountered by the duct. This should include the anticipated build-up of contamination although the effect of contamination would typically be only a small fraction of the total pressure drop due to the length, cross-section area and shape. The technique of the present invention works well with unequal engine supply pressures, as long as the supply pressure is high enough to produce the flow rate required in a duct. This is accomplished by controlling the "equivalent flow impedance" of the pressure regulating valve.

Figure 6:
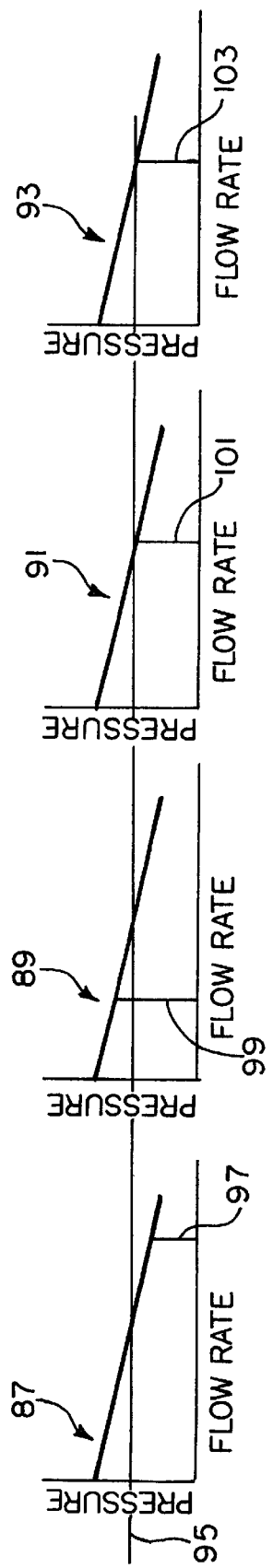
FIG. 6 is a graphical illustration of the fluid flow controlling process according to the present invention.

FIG. 6 shows the four monotonically decrasing pressure-drop characteristics 87, 89, 91 and 93 of the four flow branches as shown in FIG. 3, as a result of closed-loop control as shown in FIG. 2. FIG. 6 also includes an illustrative common sensed manifold pressure line 95. This line 95 represents the only steady-state solution for the common manifold pressure that the four control loops must continuously seek. An excess flow rate as illustrated by the exaggerated flow rate at line 97 would be impossible in the steady state since that would have created a lower pressure in flow branch 87 below the single common manifold pressure. Likewise, a low flow rate as illustrated by the exaggerated flow rate at line 99 would be impossible in the steady state since that would have created a high pressure in flow branch 89 above the single common manifold pressure.

What is claimed is:

1. A method of allocating the demand on aircraft air supply among several independently operable aircraft engines, each supplying air to a common manifold by way of a corresponding air duct, each duct having an inlet pressure control valve therein for regulating the airflow therethrough, comprising:

determining an air pressure set point for each duct;
   measuring a common manifold air pressure;
   combining the determined and measured pressures to generate a feedback for each duct; and
   utilizing the feedback to selectively control the corresponding pressure control valve for each duct independently.

2. The method according to claim 1, wherein the determined air pressure set point decreases with the flow rate measured.

3. The method according to claim 1, wherein the determined air pressure set point is a selected one of a set of predetermined values.

4. The method according to claim 3, wherein set of predetermined values is a function of duct flow rate.

5. The method according to claim 4, wherein the function has a negative slope with air pressure decreasing as duct flow rate increases.

6. The method according to claim 3, wherein the step of determining includes measuring the rate of airflow through each individual duct and utilizing the measured rate of airflow to select a corresponding one of the set of values.

7. The method according to claim 1, wherein each duct includes a heat exchanger, intermediate the manifold and corresponding pressure control valve.

8. The method according to claim 1, including the additional steps of combining the airflow through the individual ducts into a common airflow in the manifold, and supplying the common airflow to airflow utilization equipment.

9. The method according to claim 1, including the additional step of utilizing the airflow from certain of the engines to power air utilization equipment prior to the airflow entering corresponding ducts.

10. The method according to claim 1, including the additional steps of measuring the rate of airflow through each individual duct, and utilizing the measured airflow rate to determine the corresponding air pressure set point.

11. A method of controlling fluid flow from a plurality of independent fluid sources by way of a like plurality of fluid conduits each including a control valve, comprising:

predetermining a plurality of pressure control valve inlet set points for each source;
    measuring the rate of airflow through each individual conduit;
    utilizing the measured fluid flow to select one set point for each source from the corresponding plurality;
    measuring a common fluid conduit outlet pressure from the plurality of sources;
    combining the selected set point and measured common outlet pressure; and
    controlling each valve in accordance with the combined set point and measured common outlet pressure.

12. The method according to claim 11, wherein the plurality of set points is a function of the rate of airflow through the corresponding conduit.

13. The method according to claim 12, wherein the function has a negative slope with air pressure decreasing as airflow rate increases.

14. The method of claim 11, wherein the step of controlling includes adjusting the valve to decrease the pressure drop across the valve and increasing fluid flow when the set point exceeds the measured outlet pressure.

15. The method according to claim 11, wherein each conduit includes a heat exchanger through which the corresponding conduit airflow passes.

16. The method according to claim 11, including the additional steps of combining the airflow through the individual conduits into a common airflow in a manifold, and supplying the common airflow from the manifold to airflow utilization equipment.

17. The method according to claim 11, including the additional step of utilizing the airflow from certain of the engines to power air utilization equipment prior to the airflow entering corresponding conduits.

18. An aircraft pneumatic system for supplying pressurized air from a plurality of aircraft engines to r multiple air utilization devices, comprising:

a plurality of air temperature reducing heat exchangers, each having an air inlet and an air outlet;
    a like plurality of air passageways, each leading from an engine to the inlet of a corresponding heat exchanger and including a controllable pressure reduction valve for controlling the airflow from the associated engine to the associated heat exchanger;
    a manifold for merging the airflows exiting the plurality of heat exchangers into a common airflow path;
    a plurality of air passageways, each leading from a heat exchanger to the manifold and including a flow sensing device;
    a pressure sensor positioned within the manifold for determining a common fluid passageway outlet pressure;
    an air utilization arrangement receiving air by way of the common airflow path; and
    a plurality of control arrangements, each associated with and controlling a corresponding valve, each control arrangement specifying a set point pressure as a function of the flow rate.

19. The pneumatic system of claim 18, wherein each control arrangement controls the flow rate through each heat exchanger independently of the flow rates through the other heat exchangers and equalizes the pressure-drop characteristics of airflow paths from each engine to the manifold causing those paths to equally share the flow.

* * * * *